(12) United States Patent
Theurer et al.

(10) Patent No.: US 6,896,243 B2
(45) Date of Patent: May 24, 2005

(54) MACHINE FOR INSTALLING A CATENARY CABLE

(75) Inventors: Josef Theurer, Vienna (AT); Leopold Gruber, Scheibbs (AT)

(73) Assignee: Franz Plasser Bahnbaumaschinen-Industriegesellschaft m.b.H., Vienna (AT)

( * ) Notice: Subject to any disclaimer, the term of this patent is extended or adjusted under 35 U.S.C. 154(b) by 112 days.

(21) Appl. No.: 10/386,754

(22) Filed: Mar. 12, 2003

(65) Prior Publication Data

US 2003/0201431 A1 Oct. 30, 2003

(30) Foreign Application Priority Data

Apr. 24, 2002 (AT) ..................................... GM269/2002

(51) Int. Cl.[7] .............................................. B65H 59/00
(52) U.S. Cl. .............................................. 254/134.3 R
(58) Field of Search ................. 254/134.3 R, 134.3 PA, 254/134.3 FT, 310, 321, 356, 378; 242/86.7, 86.5, 86.51, 54 R, 155 BW; 212/159

(56) References Cited

U.S. PATENT DOCUMENTS 4,624,450 A * 11/1986 Christison ................... 254/273

5,826,860 A * 10/1998 Theurer et al. ....... 254/134.3 R

FOREIGN PATENT DOCUMENTS

EP               0 416 136 B1      6/1993

* cited by examiner

Primary Examiner—Robert C. Watson
(74) Attorney, Agent, or Firm—Henry M. Feiereisen

(57) ABSTRACT

A machine for installing a catenary cable of an electrical catenary of a track includes a machine frame, supported for mobility on the track by undercarriages, and a storage drum containing the rolled-up catenary cable which is pulled off the storage drum during installation with a pull-off force, the storage drum being mounted on an auxiliary frame. A vertically adjustable deflection roller is provided for guiding the catenary cable during installation.

A friction winch serves for creating a pull-off resistance counteracting the pull-off force when the catenary cable is pulled off the storage drum during installation, thus producing an installation tension. The friction winch is arranged between the storage drum and the deflection roller and is mounted on a winch frame which is connected to the auxiliary frame. A force sensor for measuring the installation tension is positioned between the winch frame and the auxiliary frame in order to keep the desired installation tension stable.

5 Claims, 2 Drawing Sheets

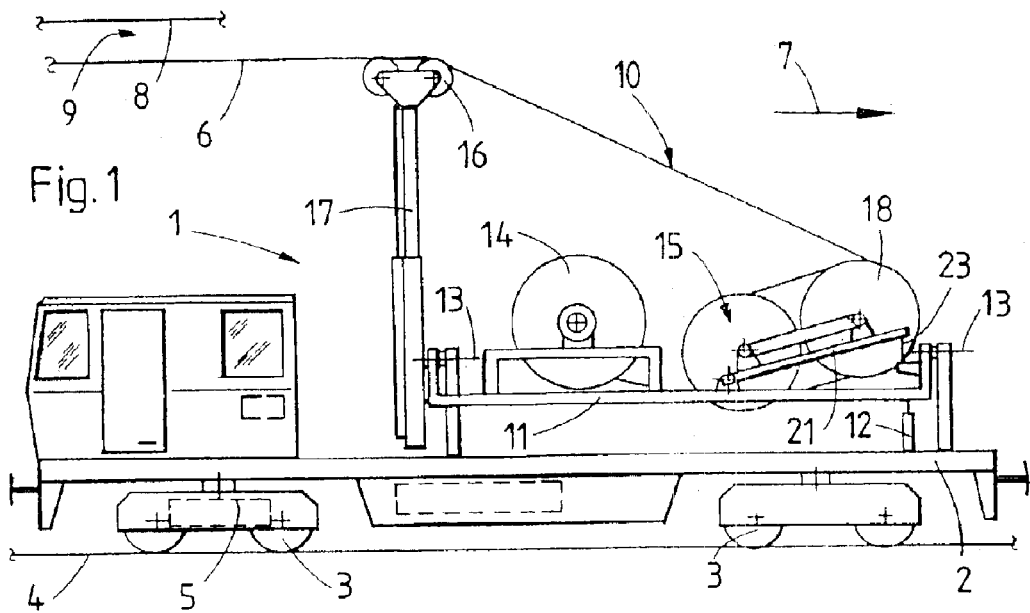
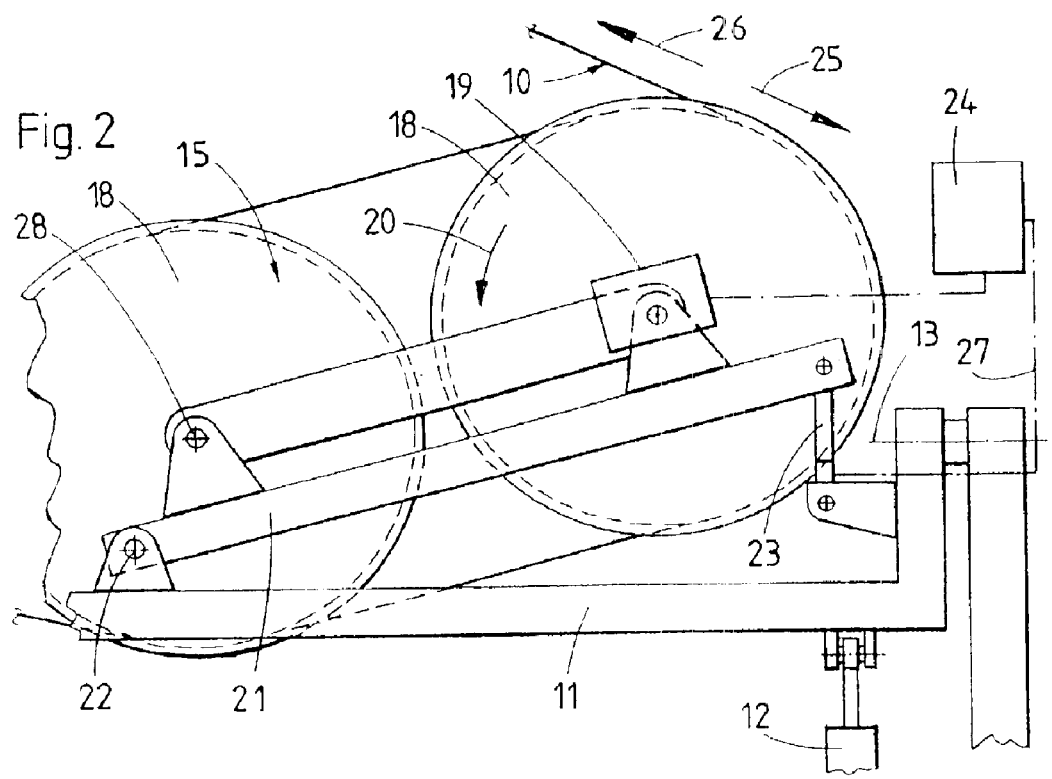
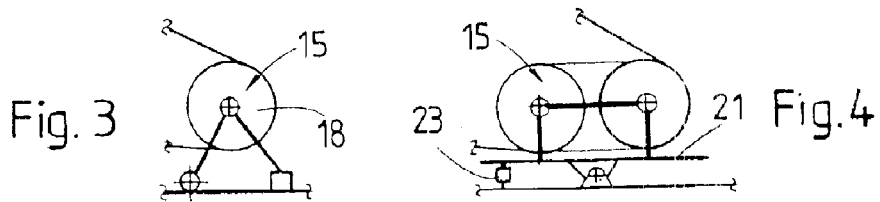

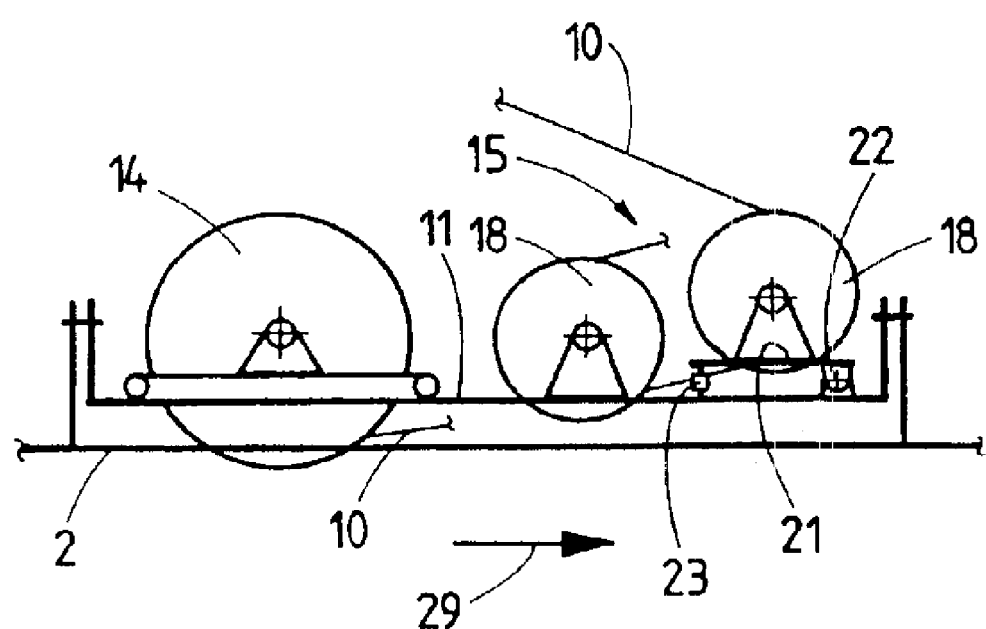

ously to provide an improved machine of the afore-described type, with which it is possible to accurately detect the installation tension of the catenary cable while at the same time avoiding time-consuming retooling or adjusting operations.

MACHINE FOR INSTALLING A CATENARY CABLE

CROSS-REFERENCES TO RELATED APPLICATIONS

This application claims the priority of Austrian utility model application GM 269/2002, filed Apr. 24, 2002, the subject matter of which is incorporated herein by reference.

BACKGROUND OF THE INVENTION

The present invention relates, in general, to a machine for installing a catenary cable formed by a contact wire or a carrying cable of an electrical catenary of a track, and more particularly but not exclusively to a machine of a type comprising a machine frame extending in a longitudinal direction and supported for mobility on the track by undercarriages, and a storage drum containing the rolled-up catenary cable which is pulled off the storage drum during installation with a pull-off force. A deflection roller is mounted for vertical adjustment for guiding the catenary cable during installation. An auxiliary frame is mounted on the machine frame for supporting the storage drum, and a friction winch is provided for creating a pull-off resistance counteracting the pull-off force when the catenary cable is pulled off the storage drum during installation, thus producing an installation tension, the friction winch being arranged between the storage drum and the deflection roller.

European Patent No. 0 416 136 B1 discloses a machine of this type including a force sensor for measuring the installation tension, the sensor being positioned between the friction winch and the deflection roller. This known arrangement has the disadvantage, however, that increased or additional manipulation is required each time a storage drum is to be exchanged. Furthermore, the force sensor needs to be readjusted when a switch is made from contact wire to carrying cable or vice versa, or when wires of different cross-section are being installed.

It would be desirable and advantageous to provide an improved machine of the afore-described type, with which it is possible to accurately detect the installation tension of the catenary cable while at the same time avoiding time-consuming retooling or adjusting operations.

SUMMARY OF THE INVENTION

According to one aspect of the present invention, a machine for installing a catenary cable formed by a contact wire or a carrying cable of an electrical catenary of a track includes a machine frame extending in a longitudinal direction and supported for mobility on the track by undercarriages; a storage drum containing the rolled-up catenary cable which is pulled off the storage drum during installation with a pull-off force; a deflection roller, mounted for vertical adjustment, for guiding the catenary cable during installation; an auxiliary frame mounted on the machine frame for supporting the storage drum; a friction winch for creating a pull-off resistance counteracting the pull-off force when the catenary cable is pulled off the storage drum during installation, thus producing an installation tension, the friction winch being arranged between the storage drum and the deflection roller and being mounted on a winch frame which is connected to the auxiliary frame; and a force sensor for measuring the installation tension, the force sensor being positioned between the winch frame and the auxiliary frame.

In a machine designed in this way, the force sensor may advantageously be structurally integrated into the system or apparatus for unwinding the cable. Said integration can be effected in such a way that any manipulative requirements on the part of an operator may be totally eliminated, and that therefore the measuring result does not depend in any way upon the reliability of said operator. Further, by incorporating the force sensor into the mounting of the friction winch, it is possible to reliably preclude any possibility of damage to the force sensor as a result of manipulations of the catenary cable at the beginning and end of a storage drum from which the cable is to be unwound.

According to another aspect of the present invention, the winch frame has two ends with regard to the longitudinal direction, one of said ends being connected to the auxiliary frame for pivoting about a pivot axis, the opposite end being connected to the force sensor. According to yet another aspect, the friction winch further includes an axis of rotation, the pivot axis being arranged to extend parallel to said axis of rotation.

According to another feature of the present invention, the friction winch further includes a drive for rotation of the friction winch, with a control circuit being provided for influencing said drive in order to change the speed of rotation in dependence upon a difference between the installation tension and a desired ideal tension of the catenary cable, the force sensor being integrated as a controlled variable into said control circuit. According to yet another embodiment, the friction winch may comprise a plurality of winch rollers of which only the last one, with regard to a pull-off direction of the catenary cable from the storage drum, is arranged on the winch frame.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a side view of a machine for installing a contact wire or carrying cable of a catenary of a track;

FIG. 2 is a side view, on an enlarged scale, of a friction winch; and

FIGS. 3, 4 and 5 are respective, highly schematic side views of alternate embodiments of the invention.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a machine, generally designated by reference numeral 1, for installing an electrical catenary 9 of a track 4. The machine 1 comprises a machine frame 2, extending in a longitudinal direction along the track 4, and undercarriages 3 as well as a motive drive 5 for mobility of the machine 1 on the track 4, with a working direction for installing the catenary 9 being indicated by an arrow 7. The catenary 9 is composed of a contact wire 6 and a carrying cable 8. For the sake of simplicity, the expression catenary cable 10 will be used from here on as a superior term for both contact wire 6 and carrying cable 8.

As becomes clear also from FIG. 2, an auxiliary frame 11 is pivotably mounted on the machine frame 2 and connected to a drive 12 for swinging the auxiliary frame 11 about axes 13 extending in the longitudinal direction. Arranged on the auxiliary frame 11 are a storage drum 14, a friction winch 15, and a vertically adjustable jib 17 equipped at its free end with deflection rollers 16.

The friction winch 15 is composed of two winch rollers 18,18 which are rotatable about approximately horizontal axes of rotation 28 with the aid of a hydraulic drive 19 in a rotation direction indicated by an arrow 20. The friction winch 15, or rather the two winch rollers 18, are supported on a winch frame 21 which, at one end, is connected to the auxiliary frame 11 for pivoting about a pivot axis 22 extending parallel to the axes of rotation 28. At the opposite end of the winch frame 21, a force sensor 23 is arranged between the winch frame 21 and the auxiliary frame 11. The force sensor 23 may have the shape of a foil strain gauge and is connected, as is the drive 19, to a control and regulating device 24.

With the aid of the machine 1, contact wire 6 or supporting cable 8, as desired, may be pulled off the storage drum 14 with a final installation tension and connected to hangers and cantilever arms (not shown) of the catenary 9. In the example represented in FIGS. 1 and 2, contact wire 6 is installed in the working direction 7 while the machine 1 advances continuously. Toward that end, the contact wire 6 is wound twice around the friction rollers 18 at the beginning of the installation process. As a result, a pull-off resistance 25 is generated by means of the friction winch 15. This resistance 25 is counteracted by a pull-off force 26 which is produced in that the machine 1 moves in the working direction 7 while an end (not shown) of the contact wire 6 is fastened to a cantilever beam.

By means of the force sensor 23, it is now possible to monitor the installation tension or pull-off force 26 continuously. Said tension may be kept stable with the aid of a control circuit 27 which, in order to avoid fluctuations of the tension, varies or changes the pull-off resistance 25 accordingly via the drive 19. The particular arrangement of the force sensor 23, as shown, obviates the need for any additional manipulations when the storage drum 14 is changed. Furthermore, no special adjustment of the force sensor 23 is required even when wires of different cross-sections are used.

FIG. 3 shows a variation of an embodiment according to the invention in which the friction winch 15 consists of only a single winch roller 18 around which the cable is wound.

According to another variant, shown in FIG. 4, the winch frame 21 is supported on a pivot axis in the manner of a rocker. In this example, the force sensor 23 is designed as a pressure gauge.

FIG. 5 shows a yet a further embodiment of the invention which differs from those described above in that the friction winch 15 comprises several winch rollers 18 which are independent of one another. The last winch roller 18 in line—with regard to a pull-off direction 29 of the catenary cable 10 from the storage drum 14—is arranged on the winch frame 21 and is thereby pivotable about the pivot axis 22. The force sensor 23, arranged between the winch frame 21 and the auxiliary frame 11, is designed as a pressure measuring bolt.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A machine for installing a catenary cable formed by a contact wire or a carrying cable of an electrical catenary of a track, comprising:

a) a machine frame extending in a longitudinal direction and supported for mobility on the track by undercarriages;

b) a storage drum containing a rolled-up catenary cable which is pulled off the storage drum during installation with a pull-off force;

c) a deflection roller, mounted for vertical adjustment, for guiding the catenary cable during installation;

d) an auxiliary frame mounted on the machine frame for supporting the storage drum;

e) a friction winch for creating a pull-off resistance counteracting the pull-off force when the catenary cable is pulled off the storage drum during installation, thereby producing an installation tension, said friction winch being arranged between the storage drum and the deflection roller and mounted on a winch frame which is connected to the auxiliary frame; and f) a force sensor for measuring the installation tension, said force sensor being positioned between the winch frame and the auxiliary frame.

2. The machine of claim 1, wherein the winch frame has two opposite ends with regard to the longitudinal direction, one end connected to the auxiliary frame for pivoting about a pivot axis, and the other end connected to the force sensor.

3. The machine of claim 2, wherein the friction winch rotates about an axis of rotation in parallel relationship to the pivot axis.

4. The machine of claim 1, wherein the friction winch includes a drive for rotation of the friction winch, and further comprising a control circuit for influencing the drive in order to change a rotation speed of the friction winch in dependence on a difference between the installation tension and a desired ideal tension of the catenary cable, said force sensor being integrated as a controlled variable in the control circuit.

5. The machine of claim 1, wherein the friction winch includes a plurality of winch rollers of which only the last one, with regard to a pull-off direction of the catenary cable from the storage drum, is arranged on the winch frame.

* * * * *